United States Patent
Neumann et al.

(10) Patent No.: US 9,520,594 B2
(45) Date of Patent: Dec. 13, 2016

(54) POROUS CARBON PRODUCT WITH LAYER COMPOSITE STRUCTURE

(75) Inventors: Christian Neumann, Hungen (DE); Jörg Becker, Niddatal (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 423 days.

(21) Appl. No.: 14/110,665

(22) PCT Filed: Mar. 27, 2012

(86) PCT No.: PCT/EP2012/055387
§ 371 (c)(1),
(2), (4) Date: Oct. 24, 2013

(87) PCT Pub. No.: WO2012/136513
PCT Pub. Date: Oct. 11, 2012

(65) Prior Publication Data
US 2014/0045072 A1    Feb. 13, 2014

(30) Foreign Application Priority Data
Apr. 8, 2011 (DE) .................. 10 2011 016 468

(51) Int. Cl.
*H01M 4/38* (2006.01)
*H01M 4/04* (2006.01)
(Continued)

(52) U.S. Cl.
CPC .............. *H01M 4/366* (2013.01); *C01B 31/00* (2013.01); *C03B 19/1492* (2013.01);
(Continued)

(58) Field of Classification Search
CPC .... H01M 4/587; H01M 4/0471; H01M 4/366; C01B 31/00; C01B 19/1492; C01B 37/005
See application file for complete search history.

(56) References Cited

U.S. PATENT DOCUMENTS 6,395,066 B1   5/2002   Tanihara et al.
7,666,380 B2   2/2010   Jaroniec et al.
(Continued)

FOREIGN PATENT DOCUMENTS

CN   101012057 A   8/2007
CN   101444710 A   6/2009
(Continued)

OTHER PUBLICATIONS

Shinae Jun et al., "Synthesis of New Nanoporous Carbon with Hexagonally Ordered Mesostructure", Journal of the American Chemical Society, American Chemical Society, Washington, DC, US, vol. 122, No. 43, pp. 10712-10713, Jan. 1, 2000.
(Continued)

*Primary Examiner* — Kenneth Douyette
(74) *Attorney, Agent, or Firm* — Tiajoloff & Kelly LLP

(57) ABSTRACT

Inexpensive product consisting of porous carbon, with a pore structure which is suitable for retaining electrode parts which can be used in particular for a use as an electrode material for a lithium-sulphur secondary battery, and a method comprising the following method steps: (a) providing a template consisting of inorganic material which contains spherical nanoparticles and pores, (b) infiltrating the pores of the template with a precursor for carbon of a first variety, (c) carbonizing so as to form an inner layer on the nanoparticles with a first microporosity, (d) infiltrating the remaining pores of the template with a precursor substance for carbon of a second variety, (e) carbonizing the precursor substance, wherein an outer layer with a second microporosity which is lower than the first microporosity is produced on the inner layer, and (f) removing the template so as to form the carbon product with layer composite structure, comprising an inner layer consisting carbon with a first, relatively high microporosity, which has a free surface
(Continued)

facing a cavity, and an outer layer consisting of carbon with a second, relatively low microporosity, which has a free surface facing away from the cavity.

8 Claims, 2 Drawing Sheets

(51) Int. Cl.
    *H01M 4/36*         (2006.01)
    *C04B 35/52*        (2006.01)
    *C01B 31/00*        (2006.01)
    *C03B 19/14*        (2006.01)
    *C03B 37/005*       (2006.01)
    *C04B 35/524*       (2006.01)
    *C04B 35/636*       (2006.01)
    *C04B 38/00*        (2006.01)
    *H01M 4/136*       (2010.01)
    *H01M 4/1397*      (2010.01)
    *H01M 4/58*        (2010.01)
    *H01M 4/587*       (2010.01)
    *H01M 4/62*        (2006.01)
    *H01M 10/0525*     (2010.01)
    *H01M 4/02*        (2006.01)

(52) U.S. Cl.
    CPC .......... *C03B 37/005* (2013.01); *C04B 35/524* (2013.01); *C04B 35/636* (2013.01); *C04B 38/0032* (2013.01); *H01M 4/049* (2013.01); *H01M 4/0416* (2013.01); *H01M 4/0471* (2013.01); *H01M 4/136* (2013.01); *H01M 4/1397* (2013.01); *H01M 4/362* (2013.01); *H01M 4/587* (2013.01); *H01M 4/5815* (2013.01); *H01M 4/625* (2013.01); *H01M 10/0525* (2013.01); *C01P 2006/12* (2013.01); *C04B 2235/3418* (2013.01); *C04B 2235/48* (2013.01); *C04B 2235/6028* (2013.01); *H01M 4/382* (2013.01); *H01M 2004/021* (2013.01); *Y02E 60/122* (2013.01)

(56) References Cited

U.S. PATENT DOCUMENTS

| | | |
|---|---|---|
| 7,854,147 B2 | 12/2010 | Huenermann |
| 2003/0026755 A1 | 2/2003 | Jaroniec et al. |
| 2003/0044603 A1* | 3/2003 | Morita ................... B82Y 30/00 428/367 |
| 2006/0133981 A1 | 6/2006 | Jaroniec et al. |
| 2006/0172189 A1* | 8/2006 | Kolodner ............ H01M 4/0471 429/129 |
| 2007/0059534 A1 | 3/2007 | Huenermann |
| 2009/0136816 A1 | 5/2009 | Kang et al. |
| 2009/0311604 A1 | 12/2009 | Nazar et al. |
| 2010/0203391 A1* | 8/2010 | Lopatin ................. B82Y 30/00 429/231.8 |
| 2011/0052998 A1 | 3/2011 | Liang et al. |

FOREIGN PATENT DOCUMENTS

| | | |
|---|---|---|
| CN | 101916844 A | 12/2010 |
| DE | 10 2005 043 289 B3 | 9/2006 |
| JP | 2000342944 | 12/2000 |
| WO | 03006372 A1 | 1/2003 |

OTHER PUBLICATIONS

Ramos da Silva, Wallau, Urquieta-Gonzalez, "Mesoporous Carbons Prepared by Nano-Casting with Meso- or Non-porous Silica Nanoparticles", Journal of the Brazilian Chemical Society, vol. 17, No. 6, 2006, pp. 1170-1180.
Espacenet English language abstract of DE 10 2005 043 289 B3, published Sep. 14, 2006.
Xiulei Ji, Kyu Tae Lee, Linda F. Nazar "A highly ordered nanostructured carbon—sulphur cathode for lithium-sulphur batteries" in Nature Materials 8, 500-506 (2009).
Espacenet English language abstract of CN 101916844 A, published Dec. 15, 2010.
Espacenet English language abstract of CN 101444710 A, published Jun. 3, 2009.
Espacenet English language abstract of CN 101012057 A, published Aug. 8, 2007.

* cited by examiner

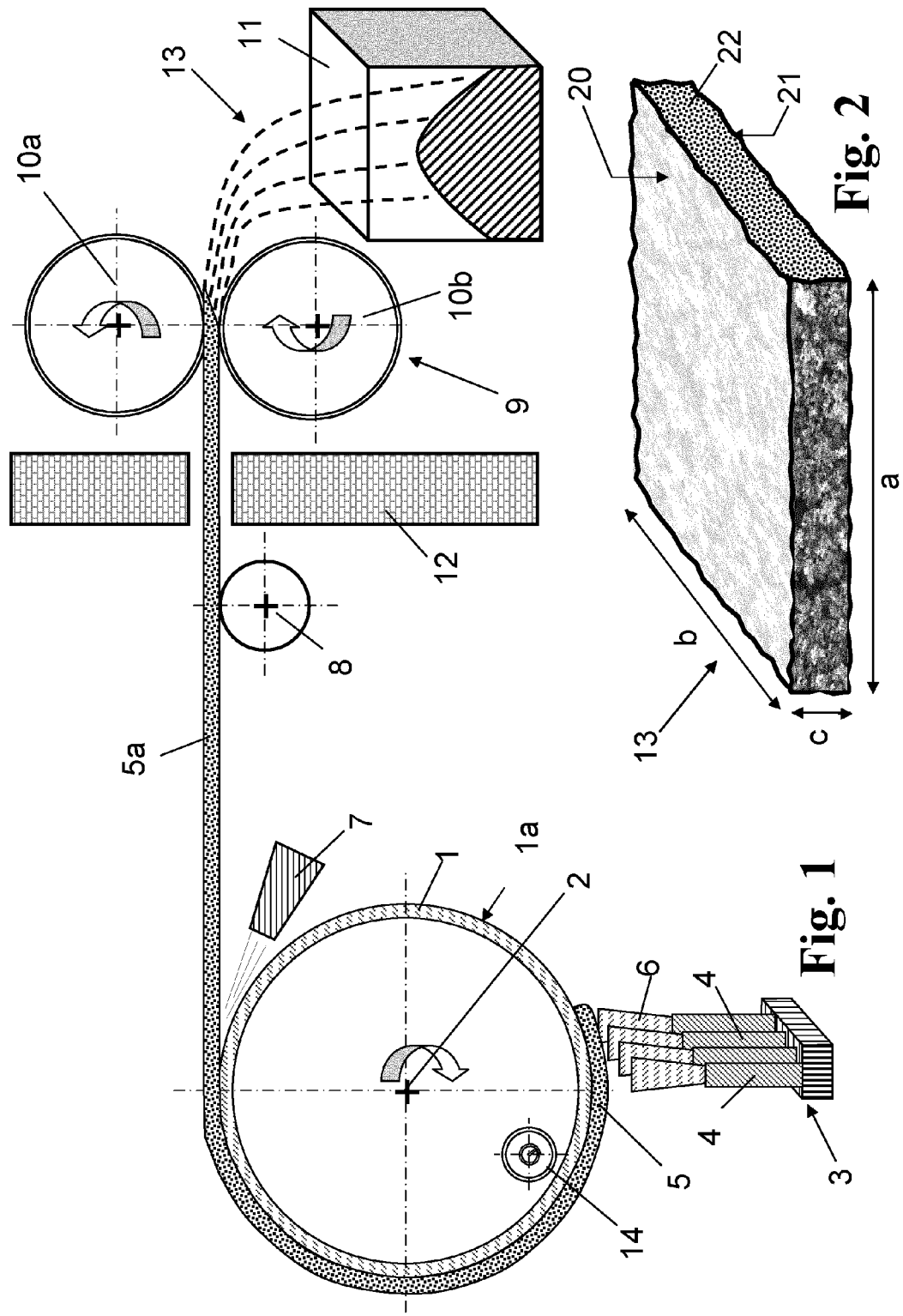

POROUS CARBON PRODUCT WITH LAYER COMPOSITE STRUCTURE

The present invention refers to a method for producing a porous carbon product with layer composite structure that has an inner layer of a first carbon variety in contact with an outer layer of a second carbon variety.

Furthermore, the present invention refers to a porous carbon product with layer composite structure that has an inner layer of a first carbon variety in contact with an outer layer of a second carbon variety.

Moreover, the invention is concerned with a use of the carbon product.

In the course of the development of portable electronic devices the demand for rechargeable batteries ("accumulators" or "secondary batteries") is growing. Basic demands are a high cell voltage, high charging capacity together with an equivalence weight that is as low as possible. Moreover, a long cycle lifetime, i.e. a low charge loss, is required during charging and discharging. Particularly for commercial applications the electrode materials should be inexpensive, non-toxic, non-explosive and easy to process.

PRIOR ART

Recently, lithium secondary batteries have gained technical importance. In such batteries a cathode (positive electrode) and an anode (negative electrode) are provided consisting of a material that is suited for the intercalation and deintercalation of lithium ions and that adjoins an electrolyte which allows movement of the lithium ions. As anode material, porous carbon structures are used that can reversibly intercalate and deintercalate the lithium ions without the structural and electrical properties thereof being substantially changed. The cathode of the lithium secondary batteries mainly consists of complex oxide of lithium and a transition metal, such as lithium cobalt oxide ($LiCoO_2$). Depending on the type of electrolyte, lithium secondary batteries are subdivided into lithium ion batteries (LIBs) and lithium polymer batteries (LPBs). A liquid electrolyte is used in lithium ion batteries, and a polymer electrolyte in lithium polymer batteries. The theoretical cell voltage is about 3.7 V and the energy density at a high efficiency factor (about 90%) is in the range of 120 to 210 Wh/kg, depending on the type. The theoretical maximum capacity is limited to about 300 mAh/g.

Apart from lithium, sulfur is a suitable candidate for electrode components because of a low equivalence weight. Moreover, sulfur is inexpensive and exhibits low toxicity. Lithium-sulfur secondary batteries have been developed for many years and they are regarded as one of the most promising secondary batteries of the next generation. In their simplest configuration the cell consists of a positive electrode of sulfur and of a negative electrode of lithium. The theoretical capacity is 1.675 mAh/g (on the assumption that all sulfur atoms are completely reduced to $S^{2-}$ upon discharge of an electrode), the rated voltage is 2.2 V/cell, and it potentially exhibits one of the highest energy densities of all accumulators to date, namely about 2500 Wh/kg. The efficiency that could so far be achieved in practice is however very low.

Reasons for this are the electrochemical specifics of the lithium-sulfur secondary batteries. The redox reaction underlying the same is described by the following reaction equation:

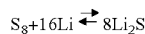

$$S_8 + 16Li \rightleftarrows 8Li_2S$$

The component sulfur (or sulfur-containing organic compounds) involved in the reaction acts however as an electrical and ionic insulator, so that the process of an electrochemical reaction requires a permanent intimate contact with an electrically highly conductive component, such as carbon.

To ensure an electrical or ionic conduction of the sulfur-containing electrode, liquid electrolytes are used—often polar organic solvents. These serve not only as ion transport media between anode and cathode, but also as ion conductors within the sulfur-containing electrode. On the one hand, this poses the problems that the electrode structure is to allow an unhindered entrance of the electrolyte. On the other hand, sulfide and polysulfide discharge products, such as $Li_2S_2$ or $Li_2S$, may dissolve in the electrolyte and may be discharged by the same. This is particularly true when great reservoirs of the electrolyte are available. The sulfur components which diffuse away from the positive electrode are no longer available for the further electrochemical reaction, whereby the charging capacity decreases. It is also possible that discharge products irreversibly precipitate from the electrolyte solution, whereby the charging capacity also decreases.

To mitigate these disadvantageous effects, US 2009/0311604 A1 suggests that the diffusion or migration of the sulfur loading out of the cathode should be minimized in that a porous carbon matrix with nanopores in which the sulfur loading is absorbed is provided as a framework material for the cathode. Nanoporosity may account for 10-99% by vol. of the electrode material, the sulfur loading filling less than 100% thereof to leave a partial volume free for the ingress and egress of the liquid electrolyte.

Sulfur particles are infiltrated into the nanopores of the carbon matrix. The pores are interconnected via nanochannels, which limit the mobility of the sulfur particles and of large-volume sulfur-lithium compounds which dissolve in the electrolyte upon discharging. As a result, these remain in the direct vicinity of the carbon matrix and thus in contact with the electrical conductor so that the latter permits the reversal of the electromechanical reaction upon charging of the accumulator. Aerogels, xerogels and molecular sieves are named as suitable start components for the carbon matrix.

A further development of this method is known from a publication by Xiulei Ji, Kyu Tae Lee, Linda F. Nazar "A highly ordered nanostructured carbon-sulphur cathode for lithium-sulphur batteries" in Nature Materials 8, 500-506 (2009). A mesoporous carbon product which is known under the name "CMK-3" and which has an ordered pore structure of a uniform pore size and a large pore volume is here used as the carbon matrix. This carbon product is produced by means of a so-called "hard template method". "SBA-15" (derived from "Santa Barbara Amorphous type material" (University of California)) is used as the hard template, a silica product with periodic and adjustable arrangement of mesopores and of a very high specific surface area. An ordered carbon structure is thereby obtained in which carbon nanotubes extending in parallel and in hexagonal arrangement and having a thickness of 6.5 nm are separated from one another via channels having a width of 3-4 nm. The carbon nanotubes are interconnected by means of carbon microfibers spanning the channels, whereby the structure is prevented from collapsing. This carbon structure is infiltrated with molten sulfur, the sulfur being imbibed by capillary forces into the channels and forming, after cooling, sulfur nanofibers having diameters of around 3 nm, which are in intimate contact with the carbon structure.

TECHNICAL OBJECTIVE

The production of the known start components for the carbon structure is complicated and the electrodes produced therefrom are thus expensive.

It is therefore the object of the present invention to provide an inexpensive product of porous carbon having a pore structure suited for retaining electrode parts, and which can particularly be used as an electrode material for a lithium-sulfur secondary battery.

Furthermore, it is the object of the present invention to indicate a method which permits an inexpensive production of such a product from porous carbon, the pore structure thereof being particularly suited for use as an electrode material for a lithium-sulfur secondary battery.

GENERAL REPRESENTATION OF THE INVENTION

As for the method, this object is achieved according to the invention by a method, comprising the following method steps:
(a) providing a template of inorganic material containing spherical nanoparticles and pores,
(b) infiltrating the pores of the template with a precursor for carbon of a first variety,
(c) carbonizing so as to form an inner layer on the nanoparticles with a first microporosity,
(d) infiltrating remaining pores of the template with a precursor substance for carbon of a second variety,
(e) carbonizing the precursor substance, wherein an outer layer with a second microporosity lower than the first microporosity is produced on the inner layer,
(f) removing the template so as to form the carbon product with layer composite structure, comprising an inner layer of carbon with a first higher microporosity, which has a free surface facing a cavity, and an outer layer of carbon with a second lower microporosity, which has a free surface facing away from the cavity.

The outcome of the method according to the invention is a composite product of carbon with a layer composite structure which encloses a multitude of cavities and which comprises at least two adjoining layers of carbon varieties that differ in their microporosity. For the production thereof one starts from a porous hard template which consists of spherical nanoparticles that are normally aggregated or agglomerated into larger, more or less spherical units and that form a porous coherent template framework. Typically, the spherical units are sintered and interconnected via so-called "sinter necks".

This porous template framework is infiltrated in a first infiltration process with a precursor for carbon of the first variety. This carbon variety is characterized in that after carbonizing it yields a carbon of a relatively high microporosity (hereinafter also called "highly porous carbon" or "turbostratic carbon"). As a precursor for the highly porous carbon, water-soluble organic carbon compounds such as saccharose, fructose or glucose are suited. In low-viscosity solutions, these can be infiltrated into the pores of the template in an easy and uniform manner. Due to the low viscosity a saturation of the template pores is achieved after one or relatively few infiltrating operations, and even plural infiltrations are relatively inexpensive.

Infiltration is carried out on the basis of known techniques, particularly immersion, pumping and swiveling, wherein a single infiltration process may suffice. In the case of several successive infiltration processes a carbonizing process is intended after each infiltration process, from time to time or once in a completing manner. The carbonization of the inner layer may also be carried out together with the carbonization of the outer layer, which will be explained in more detail further below. It might happen that the above method steps c) and d) coincide. The carbonizing process yields the inner layer of highly porous carbon which covers the nanoparticles of the template and the nanoparticle aggregates or agglomerates, respectively. A property of the inner layer that is essential for the invention is its free surface facing a cavity. A further property that is essential for the invention is its microporosity. Both properties help to retain electrode parts. This shall be explained in more detail further below.

The high microporosity of the inner layer may be accompanied by a deterioration of the electrical conductivity. To avoid this drawback, the carbonaceous layer produced as a result of the first infiltration process is coated in a second infiltration process with another, preferably graphitizable, carbon material. The pore volume which remains after the first infiltration process (and a possible carbonization) is filled fully or in part with the precursor substance. This is e.g. done on the basis of the above-mentioned methods and comprises one or several infiltration processes.

After the final carbonization an outer layer of a graphite-like layer structure is obtained that has a lower microporosity than the inner layer, a lower specific surface area and a higher electrical conductivity, and that in addition can promote a mechanical stabilization of the carbon skeleton. The carbon variety obtained as a result of the carbonization of the graphitizable precursor substance shall be designated hereinafter also as a "low-porosity carbon" or "graphite-like carbon". Hence, the properties of the outer layer that are essential for the invention are the lower microporosity thereof and the accompanying higher electrical conductivity as compared with the inner layer.

The inorganic template material is removed after carbonizing according to method step (e). It is preferably removed by chemical dissolution, wherein, in the case of a silicic-acid preform, acids (such as hydrofluoric acid) or bases (such as sodium hydroxide) should be mentioned as solvents. Hence, the template just serves as a mechanically and thermally stable framework for the deposition and carbonization of the carbon precursor.

The resulting porous carbon product exhibits a layer composite of an inner layer of highly porous carbon and of an outer layer of low-porosity carbon. The surface portions of the inner layer previously occupied by spherical nanoparticles and the aggregates/agglomerates thereof are freely accessible due to the removal of the template material. The free surface of the inner layer replicates the original nanoparticle surface and the compounds thereof via the sinter necks and therefore exhibits, except for the area of the sinter necks, substantially a concave negative curvature as the outer wall of cavities. The cavities are open voids in the mesopore and macropore range which are interconnected via the former sinter necks and which were occupied by the nanoparticles before. The cavities are interlinked via relatively narrow channels (former sinter necks) in a three-dimensional way. In these, substances, such as sulfur or sulfur compounds and complexes, as are formed in the discharging process of a lithium-sulfur accumulator in the sulfur electrode, can be fixed to some degree. This property shall also be called "retention capacity" hereinafter. This is supported by the microporosity of the cavity wall. Moreover, a larger surface normally also yields a larger number of reactive surface groups which can also contribute to a certain bonding and retention of the components in the cavity. Microporosity of the surface is characterized by pores with pore sizes in the range of less than 2 nm. By comparison, the mean sizes of the enclosed cavities are within the range of mesopores, which typically have a pore size in the range of 2 to 50 nm.

The low-porosity carbon of the outer layer reduces the microporosity and the specific surface area of the composite material on the whole, without obstructing the accessibility of a liquid electrolyte to the highly porous, turbostratic carbon of the inner layer.

Hence, with the method according to the invention one obtains an inexpensive product of porous carbon of high porosity and, nevertheless, of relatively high electrical conductivity. The micropores contained therein are suited for fixing and enclosing substances, so that the carbon product is particularly suited for use as an electrode material for a lithium-sulfur battery.

For infiltrating according to method step (b), a precursor for non-graphitizable carbon is preferably used, particularly water-soluble carbon hydrate, preferably saccharose.

Water-soluble carbohydrates are obtainable as inexpensive mass chemicals. The solutions of the carbohydrates—alcoholic or other organic solutions are also possible—are characterized by a low viscosity, so that even narrow pore channels can be infiltrated easily in a complete and uniform manner. After infiltration and removal of the solvent one obtains therefrom—after carbonization—the inner layer of non-graphitic and also non-graphitizable, highly porous carbon on the surfaces of the template, which is also designated in the literature as a "turbostratic carbon" or "hard carbon".

Turbostratic carbon has a layer structure of graphene layers. In contrast to graphite with a crystallographic long-range order of the graphene layers, the layer structure in turbostratic carbon is however more or less disordered due to translation or rotation of individual layer stacks. Carbon with a turbostratic layer structure is not graphitizable by heating and is here also designated as a "non-graphitizable carbon". The fact that a great number of commercially available carbonaceous mass chemicals can be used as a precursor for non-graphitizable carbon and that in addition these are soluble in a high concentration is of relevance to the present invention. This offers the option of a relatively simple and inexpensive production of non-graphitizable turbostratic carbon After carbonizing the inner layer advantageously has a specific BET surface area in the range of 400-600 $m^2/g$.

These details refer to an inner layer with surfaces that are free on both sides, i.e. occupied neither by the outer layer nor by the template material. A high microporosity is conducive to the retention capacity. The specific surface area is determined according to DIN ISO 9277—May 2003 (Determination of the specific surface area of solids by gas adsorption according to the BET method).

Inner layers that after carbonization have a mean layer thickness in the range of 1 to 50, preferably in the range of 2 to 10 nm, have turned out to be useful.

In comparison with graphite, turbostratic (non-graphitizable) carbon shows a comparatively low electrical conductivity and is therefore not unreservedly suited for use as an electrical conductor. However, a small thickness of the inner layer in the range of 1 to 2 nm is already enough for the formation of the retention capacity. On the other hand, relatively thick inner layers show a greater pore volume and thus a higher storage capacity and a higher retention capacity. Layer thicknesses of more than 50 nm are detrimental to the electrical conductivity.

For infiltrating according to method step (d), a precursor substance for graphitizable carbon is preferably used, particularly pitch.

Pitch, particularly "mesophase pitch", is a carbonaceous material that has an ordered liquid-crystalline structure. After carbonization the infiltrated pitch melt forms a graphite-like layer structure which although it may contain turbostratic portions is more ordered and graphite-like than the turbostratic, highly porous carbon obtained from the non-graphitizable precursor, and which particularly shows a low microporosity and thus also a smaller specific surface area and a comparatively high electrical conductivity. During carbonization the graphitizable precursor substance is subjected to a noticeable relocation of graphene layers towards a graphite structure and is also called "soft carbon" in the literature. This graphite-like deposition of carbon forms the outer layer of the layer composite and is firmly bonded to the inner layer.

With respect to an electrical conductivity of the carbon product which is as high as possible on the whole, the outer layer after carbonizing preferably has a specific BET surface area in the range of less than 50 $m^2/g$.

These details refer to an outer layer with non-occupied surfaces that are free on both sides.

Especially with respect to the mechanical stability of the layer structure and a high electrical conductivity, it has turned out be advantageous when the outer layer after carbonizing has a mean layer thickness of at least 2 nm.

In a particularly preferred variant of the method it is intended that during infiltration according to method step (d) at least 50%, preferably at least 70%, of the remaining pore volume of the pores of the template is filled with the precursor substance.

Here, the whole former template pore volume or at least the greatest part thereof is occupied by carbon, namely particularly by low-porosity carbon of the second variety. Thus the infiltrated carbon is approximately a negative imprint of the original template nanoparticles. This structure will also be called "inverse template" hereinafter. The inverse template is characterized by a hierarchical pore structure and by a relatively high electrical conductivity.

Carbonizing of the carbon precursor substance according to method step (c) or (e) is carried out at a high temperature of up to 3000° C. in a gas which is free of oxygen, if possible, or in vacuum. The minimum temperature for carbonizing is about 500° and is based on the decomposition temperature of the precursor substance or the precursor. A starting carbide formation can limit the carbonization temperature upwards, as e.g. in a $SiO_2$-containing template to a temperature below 1000° C. because of the formation of SiC. It has turned out to be particularly advantageous when providing the template comprises a soot deposition process in which a feedstock material is converted by hydrolysis or pyrolysis into template material particles and these are deposited on a deposition surface so as to form a soot body from the template material, and that the soot body is comminuted into template particles.

Preferably, a template of silicic-acid soot is here produced having an anisotropic mass distribution with hierarchical pore structure.

In this variant of the method according to the invention the production of the template comprises a soot deposition process. A liquid or gaseous start substance is here subjected to a chemical reaction (hydrolysis or pyrolysis) and deposited on a deposition surface. The reaction zone is e.g. a burner flame or an electric arc (plasma). With the help of such plasma or CVD deposition methods, which are e.g. known under the names OVD, VAD, POD methods, synthetic quartz glass, tin oxide, titanium nitride and other synthetic materials are produced on an industrial scale.

The deposition surface is e.g. a vessel, a mandrel, an outer cylindrical surface, a plate or a filter. The porous soot deposited thereon is obtained in the form of a soot layer. Its porosity is ensured in that the temperature of the deposition surface is kept so low that a dense sintering of the deposited material is prevented.

Primary particles with particle sizes in the nanometer range are formed in the reaction zone; on their way to the deposition surface these particles will agglomerate in the form of more or less spherical agglomerates or aggregates. Depending on the degree of the interaction with the reaction zone on their way to the deposition surface, different numbers of primary particles are agglomerating, basically resulting in a broad particle size distribution in the range of about 5 nm to about 200 nm. Within the aggregates and agglomerates, particularly small voids and pores in the nanometer range are present between the primary particles, i.e. so-called mesopores, whereas larger voids or pores are formed between the individual aggregates and agglomerates, thereby forming a system of interconnected macropores in the soot body and in parts thereof. This internal pore structure with an oligomodal pore size distribution is typical of a "hierarchical porosity" of the porous material. Hence, an anisotropic mass distribution with hierarchical pore structure is produced by means of the soot deposition process.

A certain thermal consolidation of the soot body is desired and achieved in that the soot body is partly sintered either in the deposition process or as an alternative or as a supplement thereto in a separate heating process subsequent to the deposition process. The aim of the thermal consolidation is a porous soot body with a certain mechanical stability that is sufficient to obtain—during subsequent comminution—soot particles that are reproducibly greater than the primary particles. The template material particles obtained by crushing or grinding also exhibit the hierarchical structure predetermined in the soot material with oligomodal pore size distribution.

In comparison with the production method via the "sol-gel route" the soot deposition method is an inexpensive method that permits a low-cost production of templates on an industrial scale.

In the soot deposition process the template material may also be obtained in the form of soot powder which is subsequently further processed with the help of granulation, press, slurry or sinter processes into the template particles. Granulates or flakes should be mentioned as intermediate products.

Synthetic porous silica ($SiO_2$) can be produced at relatively low costs on an industrial scale by means of such soot deposition methods using inexpensive start substances. The soot preform withstands high temperatures during carbonization. The upper temperature limit is predetermined by the start of the reaction of $SiO_2$ with carbon to SiC (at about 1000° C.).

The mean relative density of the soot preform is typically in the range of 10% to 40%, preferably less than 25%, of the theoretical density of quartz glass. The lower the density, the smaller are the efforts for removing the template material and the accompanying material loss. Mean densities of less than 10%, however, yield a low mechanical stability, which makes it more difficult to handle the soot preform.

Upon use of such a porous template the inner surfaces of the pores and voids are occupied during infiltration by the precursor for the highly porous carbon, so that the pore structure and particle distribution given in the template are more or less exactly transferred to the inner layer which therefore has a hierarchical structure with oligomodal pore size distribution, with the hierarchical structure corresponding to the template.

Preferably, the carbon product is produced in the form of finely divided, porous carbon flakes.

In the method according to the invention, the carbon product is normally present as a monolith or with a platelet- or flake-like morphology and can be easily divided into smaller particles. The particles obtained after the dividing operation preferably exhibit a hierarchical pore structure and are e.g. further processed by means of standard paste or slurry methods into shaped bodies or layers. The further processing of the carbon product into an electrode e.g. for a lithium-sulfur battery is carried out with the methods known from the prior art.

As for the porous carbon product, the above-mentioned object starting from a carbon product of the aforementioned type is achieved according to the invention in that the inner layer has a first microporosity and a free surface facing a cavity, and that the outer layer has a second microporosity lower than the first microporosity and a free surface facing away from the cavity.

The carbon product according to the invention shows a layer composite of an inner layer of highly porous carbon and of an outer layer of low-porosity carbon. It is essential that the inner layer has a free surface which replicates the original nanoparticle surfaces of the template material and is therefore configured as an outer wall of cavities having mean sizes in the mesopore and macropore range, which were formerly occupied by the nanoparticles. The cavities are open voids interconnected via the former sinter necks in the mesopore and macropore range, which were formerly occupied by the nanoparticles. The cavities are interlinked in a three-dimensional manner via relatively narrow channels (former sinter necks). Substances, such as sulfur or sulfur compounds and complexes, as are formed during the discharging process of a lithium-sulfur accumulator in the sulfur electrode, are fixed therein to a certain degree.

The reason is that this free surface shows a substantially concave, negative curvature and a high porosity. It acts as a confinement in which substances, such as sulfur compounds and complexes, as are formed in the discharging operation of a lithium-sulfur accumulator in the sulfur electrode, are chemically and particularly physically bound to a certain degree and thus fixed in the vicinity of the carbon skeleton. Properties of the inner layer that are essential for the invention are thus their microporous free surface facing the cavity. This promotes the retention of substances in the cavities. The micropores of the microporous inner layer have a pore size in the range of less than 2 nm. The enclosed cavities form mesopores with a pore size in the range of 2 to 50 nm and macropores with a pore size of more than 50 nm.

The side of the inner layer which faces away from the cavity is covered with an outer layer of "graphite-like carbon". It has a lower microporosity and a higher electrical conductivity than the inner layer. This improves the electrical conductivity of the composite material without impairing the retention capacity of the porous carbon of the inner layer. Moreover, the outer layer can promote a mechanical stabilization of the carbon skeleton.

The inner layer preferably consists of turbostratic carbon and it has a mean layer thickness in the range of 1 to 50 nm, preferably in the range of 2 to 10 nm.

The retention capacity of the carbon skeleton is substantially due to the cavities enclosed by the inner layer and to the high porosity and thus the great surface of the inner layer. A small thickness of the inner layer of 1 to 2 nm is enough for the formation of the retention capacity. On the other hand, thicker inner layers manifest a slightly higher absorption capacity or a slightly stronger binding capacity and thus a slightly higher retention capacity. Inner layers with layer thicknesses of more than 50 nm are detrimental to the electrical conductivity.

Especially with respect to a high electrical conductivity the outer layer preferably has a mean layer thickness of at least 2 nm.

The outer layer can have a much greater layer thickness and form a compact, stable carbon structure with hardly any free pore volume and a high electrical conductivity. Such a carbon structure can be obtained as an "inverse template" with the pores of the former template being substantially filled, as has already been explained above with reference to the method according to the invention.

The porous carbon product is preferably obtained by means of the above-described hard template method. It is normally obtained in the form of porous carbon flakes or platelets which preferably have a mean layer thickness in the range of 10 µm to 500 µm, preferably in the range of 20 µm to 100 µm, and particularly preferably of less than 50 µm.

Layer thicknesses of less than 10 µm may lead to a low mechanical stability of the carbon flakes. Carbon flakes with a thickness of more than 500 µm are more and more inhomogeneous over their thickness.

Particularly preferred is a porous carbon product with hierarchical pore structure.

The structure is obtained as a result of the production of a soot template by gas phase deposition, as has already been explained above with reference to the method according to the invention, and it is particularly well suited for the production of the electrodes of rechargeable lithium-sulfur batteries.

Upon use of the carbon flakes for producing an electrode layer of a lithium-sulfur battery, the layer thickness of the carbon flakes is ideally in the order of the thickness of the electrode layer. Transition resistances between smaller, discrete carbon particles are thereby avoided or reduced.

For the production of such an electrode layer the carbon flakes are dispersed in a liquid and further processed by means of the known methods into the porous carbon layer.

As for the use of the carbon product, the above-mentioned object is achieved according to the invention in that a porous carbon product according to the invention is used for producing an electrode for a rechargeable lithium-sulfur battery.

EMBODIMENT

The invention will now be explained in more detail with reference to an embodiment and a drawing. In detail and in a schematic illustration, FIG. 1 shows an apparatus for producing $SiO_2$ granulate particles;

FIG. 2 shows $SiO_2$ granulate particles on an enlarged scale;

Figure 3:
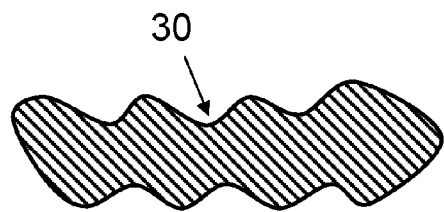
FIGS. 3 to 6 show production stages of the carbon product according to the invention in a schematic illustration.

The apparatus shown in FIG. 1 serves to produce porous granulate particles of $SiO_2$, which in the method according to the invention are used as hard template. The apparatus comprises a drum 1 which is rotatable about its rotation axis 2 and which consists of a base body made of special steel, which is covered with a thin layer of silicon carbide. The drum 1 has an outer diameter of 30 cm and a width of 50 cm. A layer 5 of $SiO_2$ soot is deposited on the outer surface 1a of the drum 1 and directly densified slightly thermally into a porous $SiO_2$ plate.

Flame hydrolysis burners 4 are used for the soot deposition; of these burners, four are arranged in successive order in a joint burner row 3 in the direction of the longitudinal axis 2 of the drum. The burner row 3 is reciprocated in parallel with the rotation axis 2 between two stationary turning points. The flame hydrolysis burners 4 are fed with oxygen and hydrogen as fuel gases and with octamethylcyclotetrasiloxane (OMCTS) as feedstock material for the formation of $SiO_2$ particles. The size of the $SiO_2$ primary particles produced thereby is in the nanometer range, wherein plural primary particles agglomerate in the burner flame 6 and are obtained in the form of more or less spherical aggregates with a specific BET surface area in the range of 25 $m^2/g$, which form a continuous, uniformly thick $SiO_2$ soot layer 5 on the outer surface 1a of the drum.

In the embodiment the rotation speed of the drum 1 and the deposition rate of the flame hydrolysis burners 4 are matched such that one obtains a $SiO_2$ soot layer 5 with a width of about 40 cm and a thickness of about 45 µm (the soot layer is drawn in FIG. 1 with an exaggerated thickness for reasons of illustration). The burners 4 simultaneously effect a certain pre-sintering of the soot layer 5 into a soot plate 5a by producing a mean temperature of about 1200° C. on the surface of the topmost soot layer. The pre-sintering process is supported by a tubular infrared radiator 14 which is arranged within the drum 1, which is formed as a hollow drum, in the left lower quadrant, and which heats the outer surface of the drum 1 from the inside shortly after the application of the soot layer 5.

The porous, slightly pre-sintered soot plate 5a obtained in this way has a mean relative density of about 22% (based on the density of quartz glass with 2.21 $g/m^3$).

After slightly more than half a drum revolution the soot plate 5a passes into the exposure area of a blower 7 by means of which a gas stream is produced that is directed against the bottom side of the soot plate 5a, so that the soot plate 5a lifts off from the outer surface 1a of the drum.

The soot plate 5a is subsequently supplied via a support roll 8 to a crushing tool 9 which consists of two counter-rotating rolls 10a, 10b between which a gap is provided having the thickness of the soot plate 5a, and the surfaces of which are provided with longitudinal profiles.

The soot plate 5a which passes through the gap is divided by the longitudinal profiles of the rolls 10a, 10b into fragments having about the same size (granulate particles 13), which are collected in a collection container 11.

A partition wall 12 is provided between the drum 1 and the crushing tool 9; the partition wall is provided with an opening for passing the soot plate 5a therethrough and serves to shield the soot deposition process against the effects of the comminuting process.

The granulate particles 13 obtained according to the method have a platelet- or flake-like morphology and a thickness that corresponds approximately to the thickness of the soot plate 5a, i.e., about 45 µm. Due to the crushing operation described, the granulate particles 13 also have about the same size, so that a narrow grain size distribution is achieved.

FIG. 2 schematically shows such a non-spherical, platelet-like $SiO_2$ granulate particle 13 according to the invention. The granulate particle 13 has a more or less planar top side 20 and a bottom side 21 extending in parallel therewith as well as lateral fracture surfaces 22, each with open pores. The thickness dimension is designated by "c" and the two lateral dimensions by "a" and "b". The structure ratio "A", i.e. the ratio of maximum structure width (a or b) and thickness (c) of the granulate particles 13, is about 10 in the embodiment.

EXAMPLE 1

The granulate particles 13 produced thereby serve as a template for the production of porous carbon flakes, as is schematically shown in FIGS. 3 to 6 and will be explained in more detail hereinafter with respect to said figures.

Under the microscope the non-spherical, platelet-like granulate particles 13 are composed of a multitude of more or less spherical agglomerates consisting of $SiO_2$ nanoparticles. Such a nanoparticle agglomerate 30 is schematically shown in FIG. 3.

The granulate particles 13 are introduced into an immersion bath of an aqueous saturated solution of sucrose. The impregnated material is subsequently dried. This impregnating and drying process is repeated once. A dried sucrose layer is formed in the pores of the granulate particles 13 and on the surfaces of the nanoparticle agglomerates 30.

Figure 4:
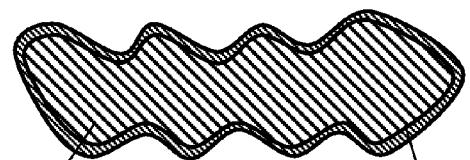

This layer is carbonized by heating in nitrogen at 700° C. to obtain an inner layer 31 consisting of porous turbostratic carbon. The inner layer 31 also covers the nanoparticle agglomerates 30, as schematically shown in FIG. 4. On average, it has a thickness of about 3 nm. A specific BET surface area of about 250 $m^2$/g is measured; attention must here be paid that the inner side of the inner layer 31 is occupied by the nanoparticles completely or for the most part. Hence, in the case of non-occupied surfaces that are free at both sides, one can theoretically expect the double BET surface area of about 500 $m^2$/g.

Subsequently, the granulate particles 30 are homogeneously intermixed with finely ground pitch powder in the weight ratio 1:4 (pitch:granulate particles) and the particle mixture is heated to a temperature of 300° C. The low-viscosity pitch envelopes the small $SiO_2$ granulate particles 13 and penetrates into and infiltrates the pores. The weight ratio of pitch and granulate particles is here chosen such that the pitch fills the pores to such an extent that a significant free pore volume will still remain.

Figure 5:
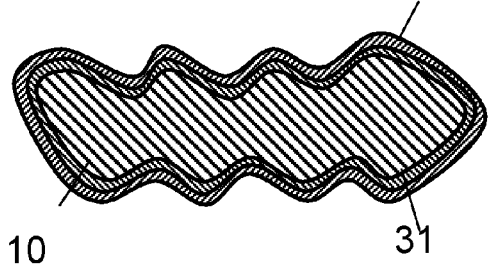

After an infiltration period of 30 min the temperature is raised to 700° C. and the pitch is thereby carbonized. The nanoparticle agglomerates 30 are now enveloped by a further carbonaceous outer layer 32, as schematically shown in FIG. 5. The outer layer 32 consists of graphitizable carbon and has a low porosity. On average, it has a thickness of about 50 nm; it should here be noted that the illustration of FIGS. 2 to 7 is not true to scale. A value of about 275 $m^2$/g is determined as the specific surface area of the layer composite, wherein about 250 $m^2$/g can be attributed to the one free surface of the inner layer and about 25 $m^2$/g to the one free surface of the outer layer (the specific BET surface area of the outer layer, which is free at both sides, can thus be calculated to be about 50 $m^2$/g.

A porous composite mass is formed consisting of non-spherical porous $SiO_2$ granulate particles having pores covered almost entirely by a double layer 31; 32 of non-graphitizable carbon and of graphitizable carbon. The $SiO_2$ granulate particles are subsequently removed in that the composite mass is introduced into a hydrofluoric acid bath.

Figure 6:
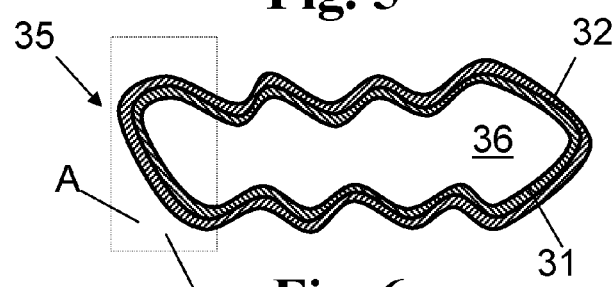

FIG. 6 schematically shows the layer composite structure 35 of porous carbon obtained after the $SiO_2$ granulate particles have been etched away. The composite structure 35 is approximately a replica of the porosity of the original $SiO_2$ granulate particles 20. It is important that the inner layer 31 has a free surface of high porosity that surrounds a three-dimensional cavity 36 in the mesopore range with concave curvature. The cavity 36 is not completely enclosed, but it is fluidically connected to other mesopores and macropores, which are also surrounded by the microporous inner layer. By contrast, the outer layer 32 consists of carbon of a relatively low porosity; its free surface is substantially convexly curved.

Figure 7:
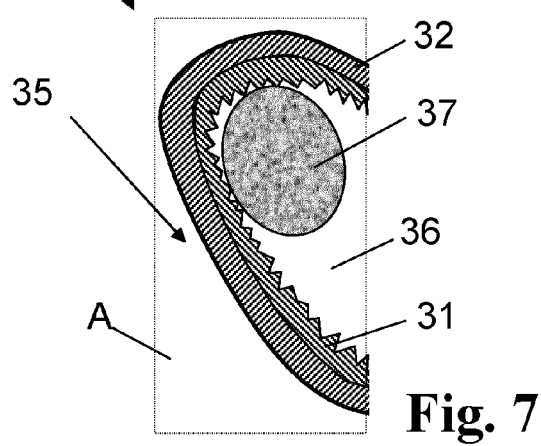
FIG. 7 shows section A of the carbon product according to FIG. 6 on an enlarged scale.

For the purpose of illustration FIG. 7 shows the section A of the layer composite structure 35 of FIG. 6 on an enlarged scale. The high inner surface of the inner layer 31 is schematically illustrated as the rough inner side. This side encloses the cavity 36 and is able to fix and retain substances, as e.g. a schematically illustrated, large-volume polysulfide discharge product 37 ($Li_2S_2$).

The layer composite structure 35, which is shown in FIG. 6 schematically and in a two-dimensional way, extends in all spatial directions and forms a carbon product having a hierarchical pore structure. The layer composite structure 35 has a specific (BET) surface area of about 275 $m^2$/g, which corresponds approximately to the sum of the BET surface areas of both layers 31; 32.

The carbon product obtained thereby is washed, dried and further comminuted in case of need. This yields carbon flakes in the case of which a finely rugged surface is penetrated by rather large voids in the manner of channels.

These carbon flakes of porous carbon with a hierarchical pore structure are particularly well suited for the production of electrode layers of the sulfur electrode (cathode) of a rechargeable lithium-sulfur battery. For this purpose they are infiltrated with sulfur in the known manner, with the sulfur fully or partly filling the cavities 36 formerly occupied by template particles 30. Due to the high inner surface in the cavities 36 the sulfur compounds which are formed and released during discharge of the battery are physically bound, whereby it is prevented that they are uniformly distributed in the electrolyte and are thereby no longer available for the electrochemical reaction.

EXAMPLE 2

In a modification of Example 1 the outer layer 32 is formed in that the granulate particles 30 are intermixed with finely ground pitch powder in the weight ratio 1.6:1 (pitch: granulate particles). This ratio is chosen such that the pitch is almost completely consumed and the pores are filled in this process, so that no significant free pore volume will remain.

The granulate particles 30 are now surrounded by a particularly thick carbonaceous outer layer of graphitizable carbon of low porosity. The $SiO_2$ granulate particles are carbonized and removed in the way as described with reference to Example 1.

A product of porous carbon is obtained having a structure which substantially represents a negative imprint of the original porous $SiO_2$ granulate particles. The "inverse template" shows a layer composite structure with an inner layer that has a free surface of high porosity and surrounds a three-dimensional cavity (mesopores or macropores) with a concave curvature, and with a comparatively thick-walled outer layer.

The invention claimed is:

1. A porous carbon product comprising
a layer composite structure having an inner layer of a first carbon variety, said inner layer being in contact with an outer layer of a second carbon variety,
wherein the inner layer has a first microporosity and a surface facing a cavity, and the outer layer has a second microporosity lower than the first microporosity of the inner layer and a surface facing away from the cavity.

2. The carbon product according to claim 1, wherein the inner layer consists of turbostratic carbon and has a mean layer thickness in the range of 1-50 nm.

3. The carbon product according to claim 1, wherein the outer layer consists of graphite-like carbon and has a mean layer thickness of at least 2 nm.

4. The carbon product according to claim 1, wherein the carbon product has a hierarchical pore structure.

5. The carbon product according to claim 1, wherein the carbon product is in a form of porous carbon flakes of carbon layers having a mean layer thickness in the range of 10 μm to 500 μm.

6. The carbon product according to claim 1, wherein the inner layer consists of turbostratic carbon and has a mean layer thickness in the range of 2 to 10 nm.

7. The carbon product according to claim 5, wherein the mean layer thickness of the carbon layers is in a range of 20 μm to 100 μm.

8. The carbon product according to claim 5, wherein the mean layer thickness of the carbon layers is at least 10 μm and less than 50 μm.

* * * * *